United States Patent [19]
Burns et al.

[11] Patent Number: 6,064,502
[45] Date of Patent: May 16, 2000

[54] OMNI-DIRECTIONAL INFRARED COMMUNICATION SYSTEM

[75] Inventors: Clay Burns, New York, N.Y.; Chaitanya Kanojia, Brookline; Martin Cosgrove, Allston, both of Mass.

[73] Assignee: Enderlin Inc., New York, N.Y.

[21] Appl. No.: 08/918,037

[22] Filed: Aug. 25, 1997

[51] Int. Cl.[7] .................................................. H04B 10/00
[52] U.S. Cl. ......................... 359/152; 359/159; 359/172
[58] Field of Search .................................... 359/152, 143, 359/159, 172, 169–170

[56] References Cited

U.S. PATENT DOCUMENTS

| | | | |
|---|---|---|---|
| 5,099,346 | 3/1992 | Lee et al. | 359/118 |
| 5,566,022 | 10/1996 | Segev | 359/172 |
| 5,757,528 | 5/1998 | Bradley et al. | 359/152 |
| 5,777,768 | 7/1998 | Korevarr | 359/172 |
| 5,861,969 | 1/1999 | Yasuda | 359/152 |

*Primary Examiner*—Kinfe-Michael Negash

[57] ABSTRACT

An omni-directional wireless infrared transceiver and system for communicating electronic data. Each transceiver comprises a receiving lens capable of detecting infrared signals of low power and low incident angle, an LED transmitting element or array, signal peak detection circuitry with dynamic threshold adjustment, signal processing circuitry, and means for electronically connecting the transceiver with a device. The transceivers can communicate without requiring a line-of-sight or obstacle-free communication path. The system is ideally suited for infrared connections in a local environment between portable computers and peripherals such as modems, printers, and keyboards. The transceivers may be embodied with removable connectors or may be integrated permanently within a device. Further, an operator may configure the system for directional data communication in situations where omni-directional communication is undesirable.

16 Claims, 7 Drawing Sheets

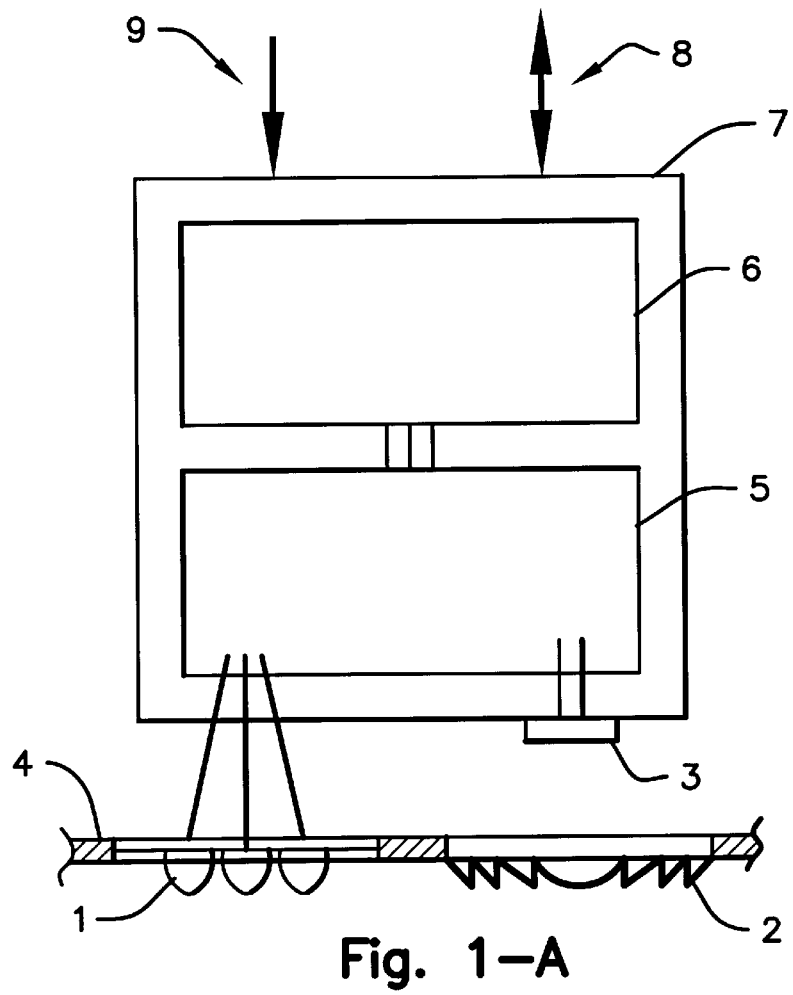
Fig. 1-A
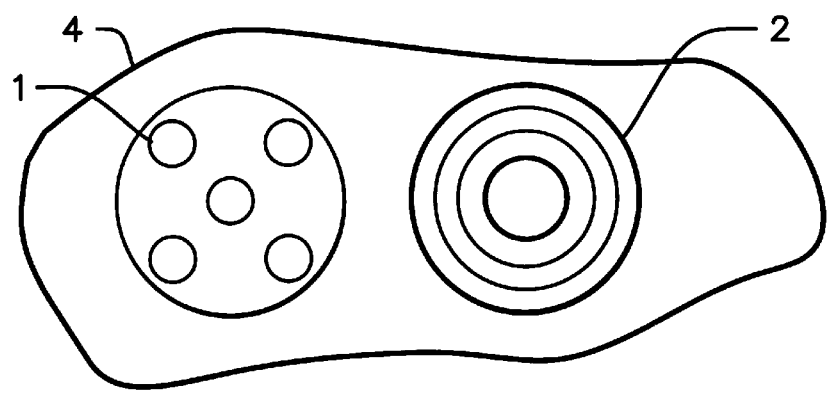
Fig. 1-B

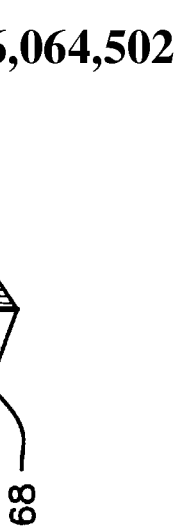
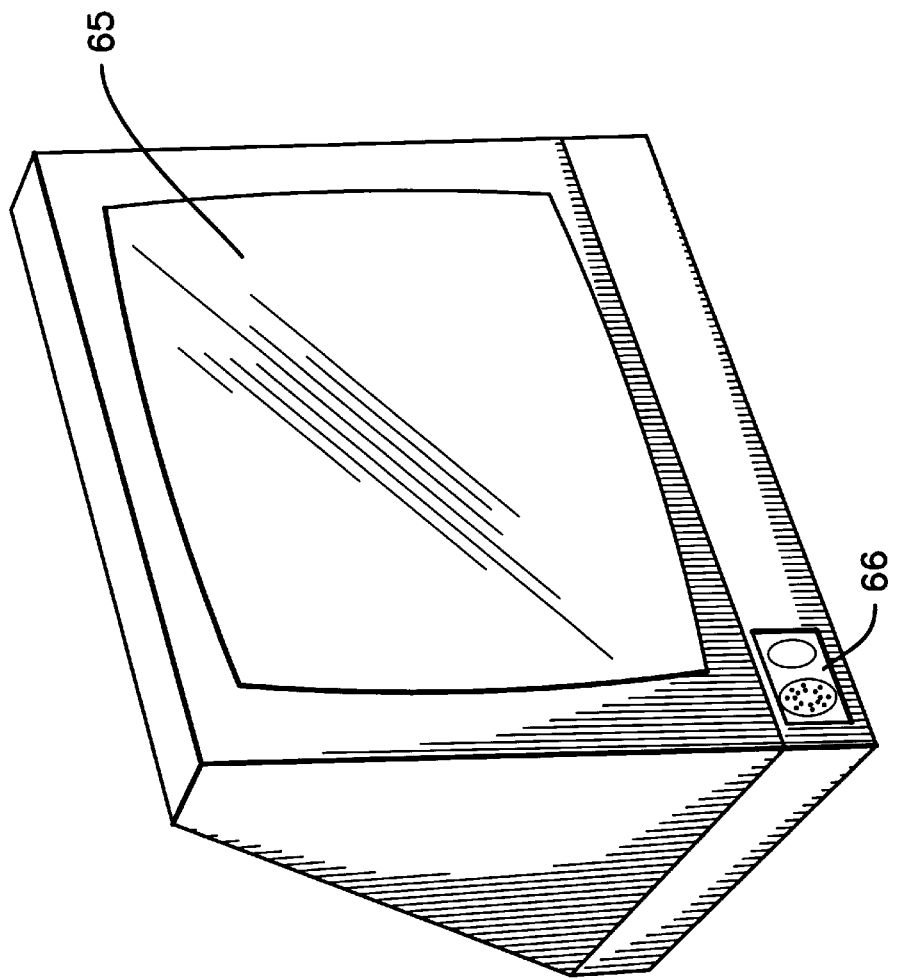
Fig. 6

OMNI-DIRECTIONAL INFRARED COMMUNICATION SYSTEM

BACKGROUND OF THE INVENTION

The present invention concerns wireless technologies for electronic devices within a single interior location. This category of wireless technology is often referred to as "local" wireless communication.

There are a number of products utilizing infrared signals for local wireless communication in the computer and electronics industry. Infrared's advantages over other wireless technologies include low cost, low complexity, low power consumption, and directionality. Because the infrared signal is generally directional, it provides high security and low interference with other local signals. However, signal directionality is also infrared's primary limitation; devices must typically be in line-of-sight, that is the infrared transceivers must be generally pointed at each other in order to maintain connection. Another limitation is that infrared signals will not pass through solid objects. Therefore, the signal path must also be clear of obstacles.

In contrast to infrared, radio and cellular waves can pass through solid objects and need not be directed in local areas. However, radio and cellular systems typically require more power than infrared, are bulkier, more costly, and require an antenna for clear reception. Further, they are less applicable to environments where several other wireless devices are in operation, because the likelihood of interference and possible signal tampering is increased. An example of such interference is often found in the cordless phone.

An important factor in the use of wireless communication systems is the intended environment. Infrared links are often favored in large office environments because they may be locally directed, and may therefore be arranged such that various infrared signals utilized simultaneously by different workers will not interfere with one another. However, workers are still generally tied to their respective workstations due to infrared's line-of-sight and obstacle-free limitations.

Small businesses are a different case. They often have fewer than ten employees, and in many cases comprise only a sole professional or tradesperson. For these businesses interference issues are less important. Further, there is a wider variety of workspaces and working styles; owners and employees are more likely to work at a coffee table, sofa, easy chair, or other non-traditional workspace. These people often use portable computers and frequently need to reconnect modem, fax, and printer cables when moving around in their workspace or returning from meetings and business trips.

The number of home computer users is growing due to the evolution of the internet and developments in integrated home computer solutions such as Web-TV. The home may represent an even smaller environment and fewer number of users than a small business, and the nature of the computer workspace and user interaction becomes even more varied; computers are used in living rooms, bedrooms, kitchens, home offices, basements, dens, game rooms, and so on. The structure of these computer interaction environments can differ markedly from that of the standard desk workspace found in most offices.

Finally, hotel rooms, conference rooms, and other temporary locations are also becoming common environments for the use of portable computers such as laptops, notebook computers, and palmtops. These areas have environments similar to those of the small business and home.

There is thus a need for an improved yet economical infrared connection for local wireless communication between computers and peripherals. Further, the need is greater in the small business, home, and remote location environments than in the large corporate environment because: a) low cost is generally more critical in the smaller environments than in the corporate environment, b) flexibility of workspace and habits is more varied in the smaller environments than in the corporate environment, c) many corporate environments are already served by wireless LAN systems, which are not appropriate for the smaller environments, d) interference dangers are limited in the smaller environments, and e) extended use of internet, email, and integrated home computer solutions is greater in the smaller environments, thereby requiring improved flexibility in computer location and use. The present invention relates to an apparatus for communicating local electronic data using infrared waves that meets the needs listed above and that may be employed in a number of applications.

U.S. Pat. No. 5,345,327 to Savicki [1994] discloses a system for diffuse infrared communication comprising two particularly distinguishing features:

a) detection of the edge of the digital infrared signal, and b) use of a non-directional concentrator in the form of a convex hemisphere.

However, the system to Savicki suffers from the following disadvantages:

a) a single system employing edge signal detection is inferior for use among a variety of devices. Because edge signal detection relies on a relatively consistent and known slope of the infrared signal frequency in order to differentiate the signal from the ambient noise frequencies, it cannot be easily employed with devices where the incoming signal is of varying waveform or irregular cycle, such as the case with modems, keyboards, and printers, unless a substantial amount of additional processing electronics are incorporated to identify the signal. This requires additional cost and complexity in the processing circuitry, or requires that the transceiving devices are placed in line-of-sight with each other to reduce the possibility of interference with other signals and ambient noise.

b) the system is not applicable for simultaneous two-way communication between the transceivers, as needed in the case of a modem or printing with handshaking to maintain data integrity. This is because the forms of the outgoing and incoming edge-detected signal are the same, thereby necessitating that each transceiver wait until a message is received before sending a reply in order to avoid interference between signals within the system. Thus, while the Savicki signal may be differentiated from the ambient noise, it suffers from the undesirable possibility of interference within its own system when simultaneous two-way communication is required.

c) a convex non-directional concentrator is less efficient due to loss of light flux in the infrared range than an alternative receiving lens disclosed in the present invention, and does not help to alleviate the need for the transceiving elements to be in line-of-sight.

d) the system is limited to a preset directionality of infrared signals, and cannot be modified by the user for uni-directional use when a direct path of communication is desired to reduce interference.

U.S. Pat. No. 5,359,189 to Savicki [1994], discloses a non-directional concentrator comprising a hemispherical lens having a radius of a specified range and a flattened top. While the disclosed concentrator improves non-directional infrared data communication, the hemispherical shape is less efficient than an alternative receiving lens disclosed in the present invention, and does not in itself alleviate the need for the transceiving elements to be in line-of-sight. Further, the concentrator does not provide for adjusting the system for wider or narrower bands of directionality.

OBJECTS AND ADVANTAGES

While the prior inventions and existing technologies may be used for local wireless electronic data communication, they generally suffer from one or more disadvantages. Accordingly, several objects and advantages of the present invention are:

a) to provide an omni-directional local infrared wireless electronic data communication system that does not require line-of-sight transmission, b) to provide a local infrared electronic data communication system that maintains connection when blocked or briefly interrupted, thereby providing superior reliability and data integrity, c) to provide a local infrared connection between a computer and variety of peripheral devices, such as a modem, printer, or keyboard, whereby users can operate the devices for various activities such as email, internet, printing, keyboard input, and electronic faxing in various environments such as living rooms, bedrooms, kitchens, home offices, basements, dens, game rooms, and whereby users can move the devices within a space while operating the devices via the infrared link, d) to provide a system for communicating omni-directional infrared electronic data between two or more electronic products, such as televisions and controllers, video recorders and projectors, handheld scanners, body-mounted computers, tracking devices, and other input or output devices, e) to provide an omni-directional local infrared communication system that can be implemented to connect to a device in a number of forms, including separate adapters, semi-permanent connectors, plug-in modules, and modules that are integrated and built-in to the device, and, f) to provide a universal local wireless electronic data communication system that can be adjusted for both uni-directional and omni-directional use.

SUMMARY OF THE INVENTION

The present invention discloses a system for communicating electronic data within a local area using an omni-directional infrared system. While the fundamental invention has several applications in industry, business, and home electronics, the preferred embodiment comprises a local infrared communication system for portable or desktop computers and peripherals. The infrared communication system provides a superior low-cost wireless solution for small to medium size environments, rooms, and areas such as those found in small businesses, home offices, houses, apartments, and hotel rooms. A further embodiment of the invention provides adjustability of the directionality of the system so that it may be optimized for wide or narrow beam use, providing a universal system for a variety of operating environments.

BRIEF DESCRIPTION OF THE DRAWINGS

FIG. 1-A shows a transceiver in accordance with the invention, in partial block diagram form, FIG. 1-B shows a front surface view of the transceiver of FIG. 1-A, FIG. 6 shows a television-computer and keyboard employing the system of the invention.

DETAILED DESCRIPTION OF THE PREFERRED EMBODIMENT

Figure 2:
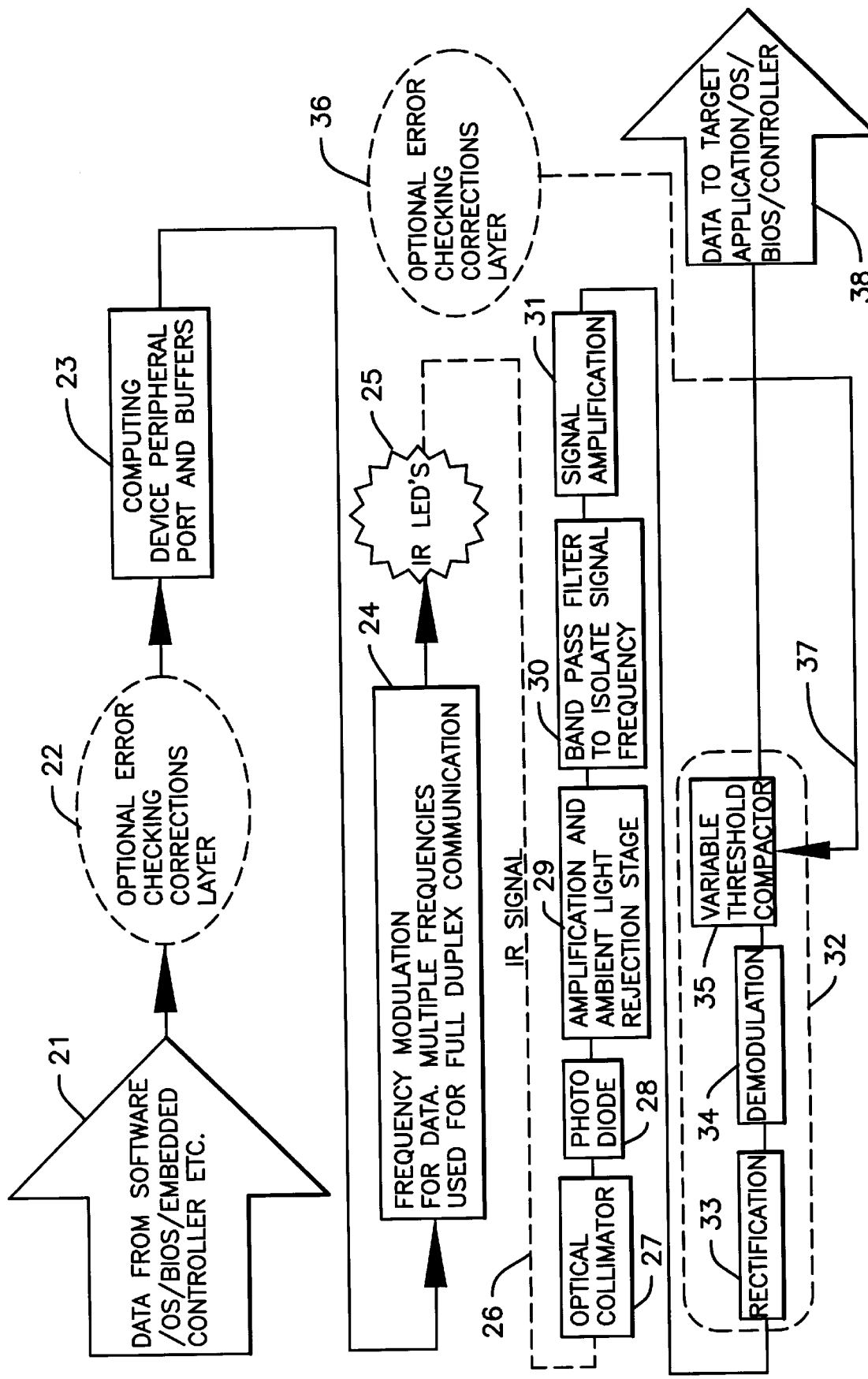
FIG. 2 shows the top-level architecture for the electronics.

FIG. 1-A shows a schematic diagram of an omni-directional infrared transceiver for communicating electronic data. The transceiver is electronically connected to a device via means 8, which may comprise a wire, solder joint, connector, or other suitable method. The device may be a portable or movable device, such as a notebook computer, or a stationary device, such as a printer. Power is applied to the transceiver via means 9, which may include power from the device, batteries, or separate AC power.

The transceiver assembly includes circuit board 7 and enclosure surface 4. The enclosure surface may be part of the device or a separate transceiver enclosure. Collector lens 2 and LED array 1 are located on the outside of the enclosure. Inside the enclosure are infrared signal processing circuitry 5, device communication processing circuitry 6, and photo diode 3.

Two transceivers are required for communication of electronic data between two devices. The devices are located in a room or area such that the transceivers are generally within 30 feet of each other. Data communication is performed normally, as though the devices were connected by a cable or wire. The devices may be moved relative to each other, as long as they remain within a single area such that local signals may be transmitted and received.

Collector lens 2, shown in cross-sectional view in FIG. 1-A, is a preferred embodiment of a non-directional collecting and concentrating lens. Lens 2 is relatively large in diameter compared with photo diode 4, which is mounted below the lens at a distance equal to the focal point of the lens. Lens 2 generally resides in a flat plane, and consists of a number of raised concentric rings whose cross sections are that of a prism. The lens may also include a number of flat concentric rings, often alternately dispersed with the prismatic rings. These features provide optimum collection and concentration of infrared signals of both low and high incident angle. Further, the lens reduces the loss of light flux in the infrared range compared with a traditional dome lens, thereby enhancing relative signal intensity. A lens of this general type is commonly known as a Fresnel lens, although variations on this configuration are included within the present invention.

FIG. 1-B shows a schematic diagram of the front surface of the transceiver. Enclosure surface 4 is shown in partial cut-away view, upon which are located LED array 1 and collector lens 2.

FIG. 2 shows the top-level electronics architecture for infrared data communication according to the invention. Transmitting device data, 21, passes through an optional error-checking layer, 22, and is communicated to the transceiver via device port 23. At stage 24 the data are modulated into multiple frequencies for full duplex communication, and are then transmitted via infrared LED array 25. The infrared signal, 26, passes through collector lens 27 and is received by photo diode 28, along with ambient light noise. Most ambient light is rejected at initial signal amplification stage 29. The signal frequency is isolated using a high-low combination band pass filter stage, 30, and the signal is further amplified at stage 31. The peak signal detection stage 32 comprises rectification 33, demodulation 34, and variable threshold comparator 35. If the data are invalid, the peak threshold is iteratively adjusted according to feedback loop 37 until acceptable data are obtained. Finally, valid data are passed through optional error checking stage 36, and onto the receiving device 38. Error checking stages 22 and 36 are optional because some devices include internal error-checking routines.

Figure 3:
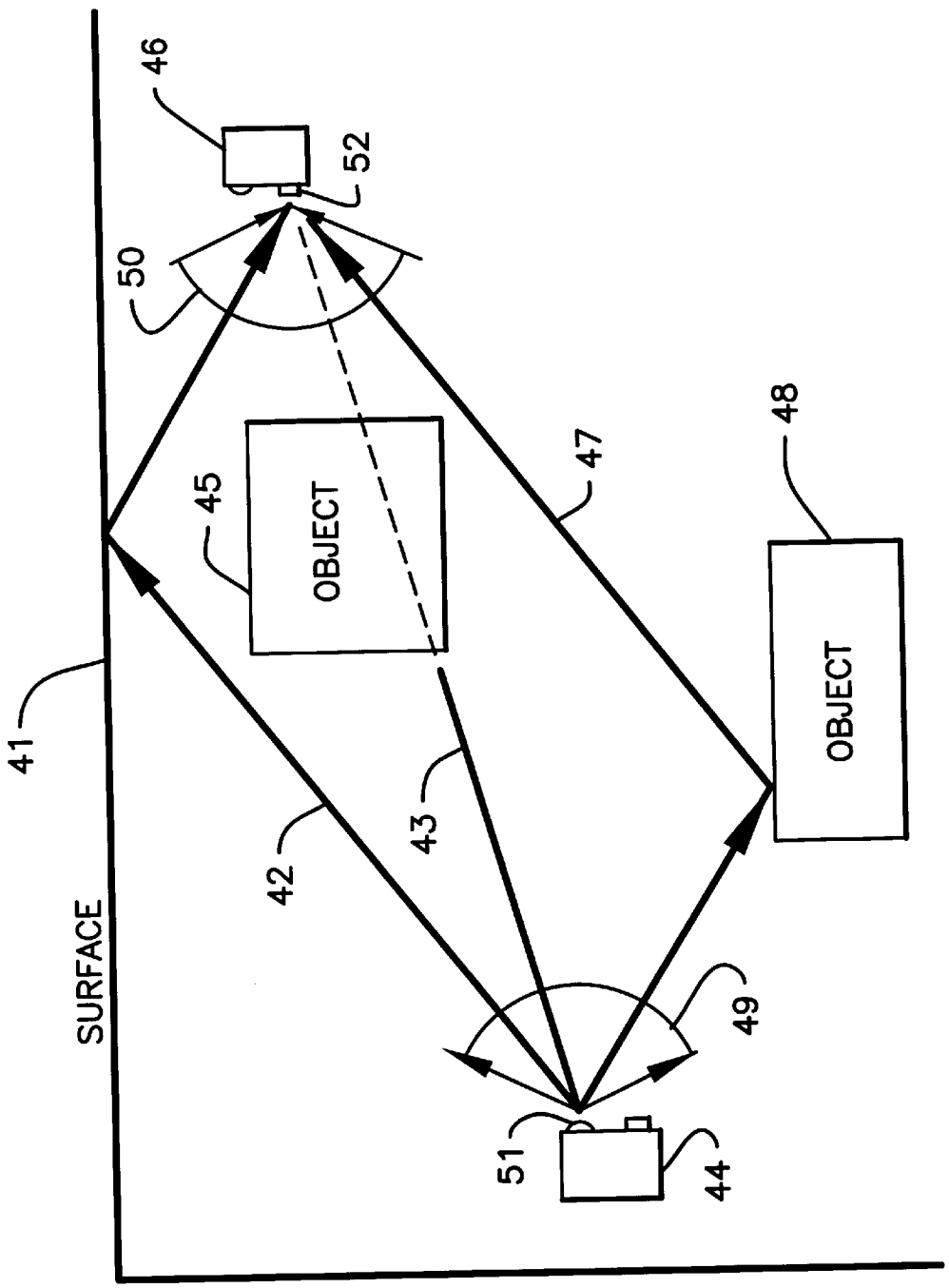
FIG. 3 shows a schematic representation of the peak detection method including the use of a dynamic threshold.

FIG. 3 shows representative infrared signal paths, including direct and single bounce signals, between two omni-directional transceivers 44 and 46. Infrared signals from transceiver 44 are transmitted through LED array 51. Signals are received by transceiver 46 through collector lens 52. In this scenario, direct signal 43 is blocked by object 45, which may comprise furniture, equipment, persons, and so on. "Single-bounce" infrared signals 42 and 47 travel around the object, bouncing off surface 41 and object 48 respectively. Wide conical angles of transmission, 49, and reception, 50, are possible. Thus there is an infinite range of signal paths that are possible, of which signals 43, 42 and 47 are only representatives. When object 45 is no longer blocking the path, signal 43 can pass directly between the devices with no bounces. Signals are transmitted in the same way from transceiver 46 to transceiver 44, often simultaneously.

Signals of two or more bounces may also occur in this system. For example, if one transceiver is aimed directly away from the other transceiver, the signal may reflect off two surfaces before being received. Such signals are less reliable than direct or single-bounce signals because most of the signal intensity is lost after the first bounce. However, depending on the strength of the signal and the nature of the reflecting surface, some "two-bounce" infrared signals will provide or augment connection between the transceivers.

Figure 4:
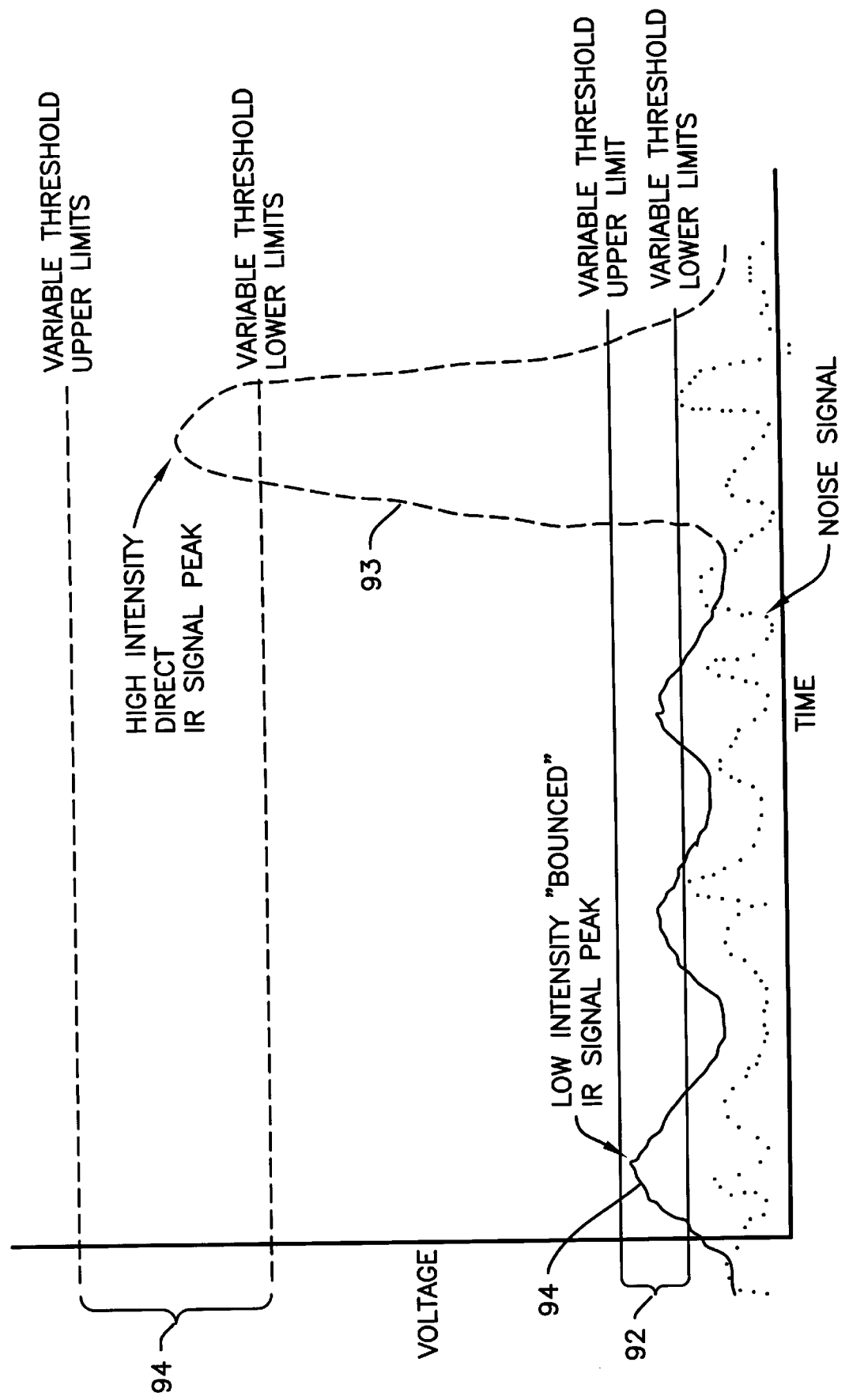
FIG. 4 shows a schematic example of how the infrared signal is communicated in a typical environment when the line-of-sight path is blocked.
Figure 7:
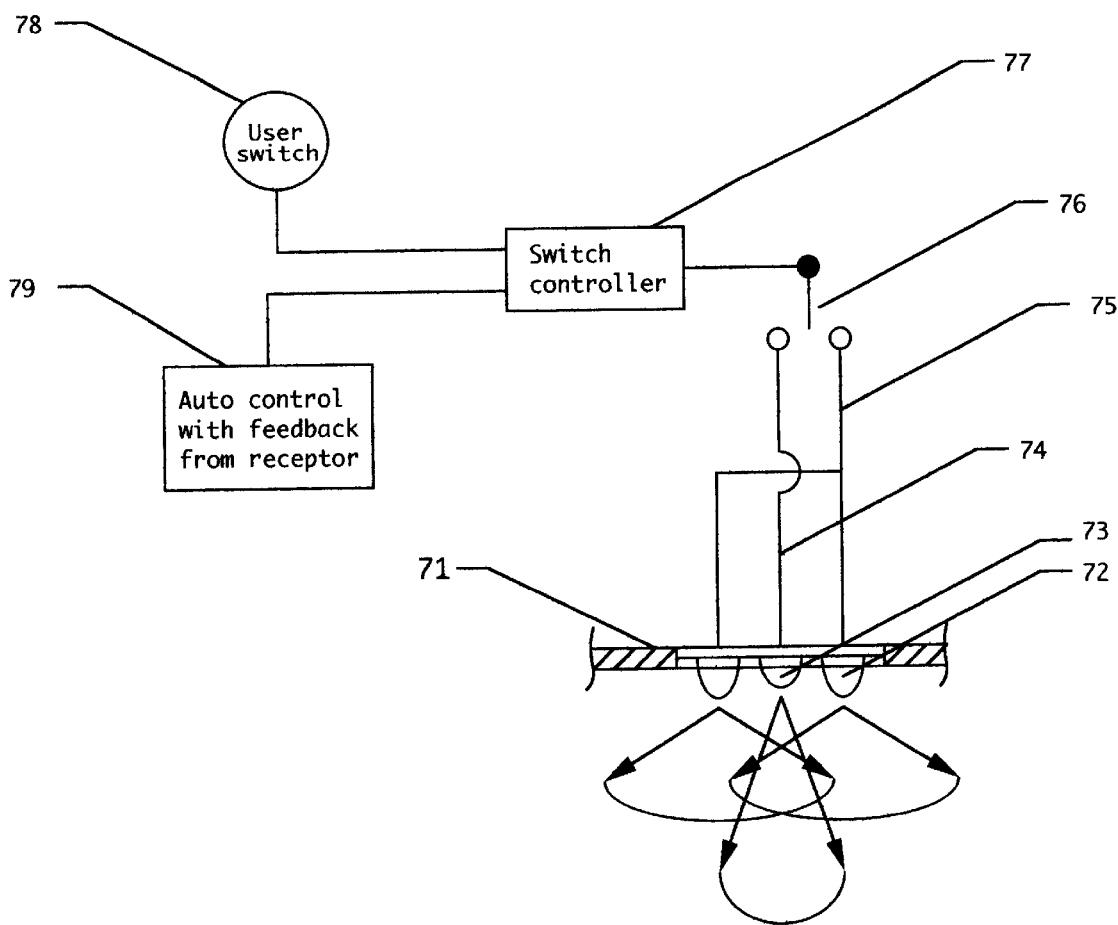
FIG. 7 shows an adjustable directionality feature that may be employed in the system.

FIG. 4 shows waveforms illustrating the peak detection methodology with dynamic threshold used to identify the infrared signal. Infrared signal 90 is identified from ambient noise 91 by selecting the strongest peak signal within a threshold band 92. Threshold band 92 is continuously monitored, recalculated, and adjusted during the search for the infrared signal by means of a comparator loop. This methodology allows for the detection of the infrared signal independent of the frequency or form of the infrared wave, thereby providing a system that can operate with a variety of infrared signals from a modem or other peripheral device, and can transmit signals simultaneously without interference of the signals. In the case where a direct line-of-sight signal is received, a signal peak of very high intensity, 93, is detected via dynamic adjustment of the signal amplitude threshold levels to band 94. This information is recorded for optional continuous automatic adjustment of directional and omni-directional infrared signal transmission (FIG. 7).

Figure 5:
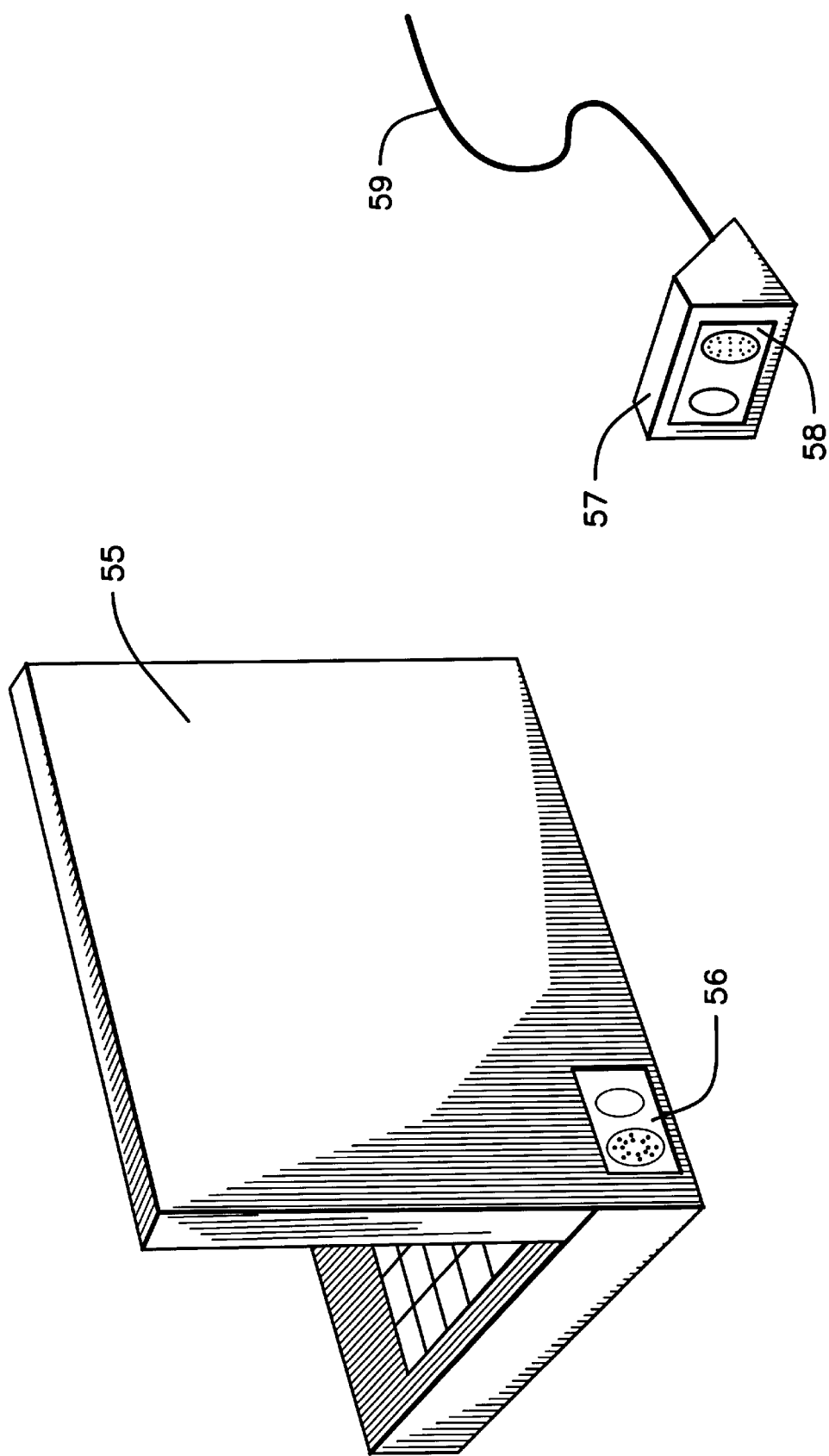
FIG. 5 shows a portable computer and wireless modem employing the system of the invention.

FIG. 5 shows the omni-directional infrared communication system for use with a portable computer and a modem. Transceiver 56 is built-in to portable computer 56. Transceiver 58 is integral with modem 57 and is located on a nearby surface. Modem 57 includes standard phone cable 59.

To operate the system, cable 59 is connected to a phone jack and modem 57 is placed on a surface within 30 feet of the computer. The computer is then operated normally. When the modem or internal fax functions are desired, the appropriate port for modem communications is selected using the computer's associated internal software.

FIG. 6 shows the omni-directional infrared communication system for use with a keyboard 67 and device 65, which may be a computer, internet-capable television, or any electronic device requiring a keyboard. Transceiver 66 is built-in to device 65. Transceiver 68 is integral with keyboard 67. The keyboard is operated normally in a local environment. The keyboard may be moved to various locations in a room or area while maintaining connection.

FIG. 7 shows a preferred embodiment of a feature which provides automatic or manual adjustment of the directionality of the omni-directional infrared system for different environments. Transmitting LED array 71 is comprised of wide-beam LED's 72 and narrow-beam LED 73. Switch 76 is employed to select between wide or narrow beam transmission, and is controlled by switch controller 77. When switch 76 is connected to LED's 72 via circuit 75, a wide-angle beam and thus non-directional transceiving is provided. When switch 76 is connected to LED 73 via circuit 74, a narrow-beam and thus uni-directional transceiving is provided. Switch controller 77 may be governed manually by a user control 78, such as a toggle switch or push-button. Switch controller 77 may also be controlled automatically using an electronic circuit 79 that monitors the need for omni-directional connection when line-of-sight is not possible, i.e. when a high-intensity peak as shown in FIG. 4 is not obtainable.

Additional LED's may be incorporated into the array having varying degrees of beam concentration, and switch 76 may be configured to include additional settings or a continuous range of variable adjustment. Further, adjustability of the directionality of the system may be augmented using additional mechanical or optical methods, such as mechanical collimators, optical shutters, and adjustable field-of-view LED'S.

ADDITIONAL EMBODIMENTS

In addition to the embodiments of the invention disclosed above, there are a number of other embodiments and applications:

In one embodiment the system may be designed to provide a longer range of connection of up to 100 feet by supplying a increases in power, receiving lens size, and LED array configuration.

In still another embodiment, several units may be employed in a large area and configured to communicate with each other, thereby increasing the range and networking capability of the system.

In related embodiments, the transceivers may be implemented in a number of packaging configurations, such as semi-permanent modules, plug-in modules, single and multiple chip-sets, and separate adapters requiring connectors well known in the industry including but not limited to: parallel, serial, keyboard, video, PCMCIA, universal serial bus, audio, and RS-232.

In yet another embodiment the technology may be used for communication between a wearable personal computer and its associated peripherals.

In further embodiments, the system may be configured for use with existing communication protocols, such as universal serial bus (USB) protocols and interfaces, and Infrared Data Association (IrDA) standards.

Finally, in addition to the disclosed embodiments, the system may be used for communicating data between any number of electronic products, including: computer to computer, computer with other devices such as printers, fax machines, handheld scanners, video cameras, video and slide projectors, and other input or output systems such as television and video game controllers, audio speakers and headphones, remote inventory and tracking devices, and telephone signal devices.

We claim:

1. A system for communicating electronic data between two spatially separated devices including two transceivers connectable to the devices, each transceiver comprising:

an infrared transmitting element or array connected electronically to the device, and; an infrared receiving element, such as a photo-diode receptor, said receiving element coupled with an optical receiving lens and connected electronically to circuitry including signal processing and means for signal peak detection with dynamic threshold adjustment for separating the communicated signal from other ambient signals, said circuitry connected electronically to the device, wherein the transceivers maintain wireless communication via direct infrared signals and reflected infrared signals when not aimed at each other and even when obstacles block the path of communication.

2. The system of claim 1, in which optical isolation means are incorporated around the photo-diode for further maintaining signal and data integrity.

3. The system of claim 1, in which the receiving lens comprises multiple raised prismatic annular surface features with angles or curves to enhance the detection of infrared signals of low incident angle or low power.

4. The system of claim 1, in which the receiving lens is a Fresnel lens.

5. The system of claim 1, in which the receiving lens is a spherical, hemispherical, or parabolically curved lens.

6. The system of claim 1, in which at least one of the devices is a computer or incorporates computer functions.

7. The system of claim 1, in which one of the devices is a computer and another device is one of: another computer, a modem, a keyboard, a printer, a projector, a pointer, and another input or output device.

8. The system of claim 1, in which the transceiving units are removably connected to the devices.

9. The system of claim 1, in which the transceiving units are permanently built-in to the devices.

10. The system of claim 1, in which, the directionality of the system is selectively or automatically adjustable between a wide and narrow range of directionality.

11. An apparatus for communicating electronic data between a computer and a peripheral computer, input, or output device, comprising:

a first transceiving apparatus connected to the computer comprising an infrared transmitting element or array connected electronically to the computer, and; an infrared receiving element, such as a photo-diode, said receiving element coupled with an optical receiving lens and connected electronically to circuitry including signal processing and means for signal peak detection with dynamic threshold adjustment for separating the communicated signal from other ambient signals, said circuitry connected electronically to the computer, a second transceiving apparatus connected to the peripheral device and which communicates with the first transceiving apparatus, said second transceiving apparatus comprising an infrared transmitting element or array connected electronically to the device, and; an infrared receiving element, such as a photo-diode, said receiving element coupled with an optical receiving lens and connected electronically to circuitry including signal processing and means for signal peak detection with dynamic threshold adjustment for separating the communicated signal from other ambient signals, said circuitry connected electronically to the device, wherein the computer and peripheral device maintain wireless communication via direct infrared signals and reflected infrared signals when not aimed at each other and even when obstacles block the path of communication.

12. The apparatus of claim 11, in which the receiving lenses comprises multiple raised prismatic annular surface details with angles or curves to enhance the detection of infrared signals of low incident angle or low power.

13. The apparatus of claim 11, in which the receiving lenses are Fresnel lenses.

14. The apparatus of claim 11, in which said transceivers are self-contained units which may be removably connected to the computer and peripheral.

15. The apparatus of claim 11, in which said transceivers are built-in to the computer and peripheral.

16. The apparatus of claim 11, in which the directionality of the system is selectively or automatically adjustable between a wide and narrow range of directionality.

* * * * *